April 19, 1955  F. W. B. PORTER  2,706,703
CATALYTIC DESULPHURISATION OF PETROLEUM HYDROCARBONS
Filed Feb. 23, 1951
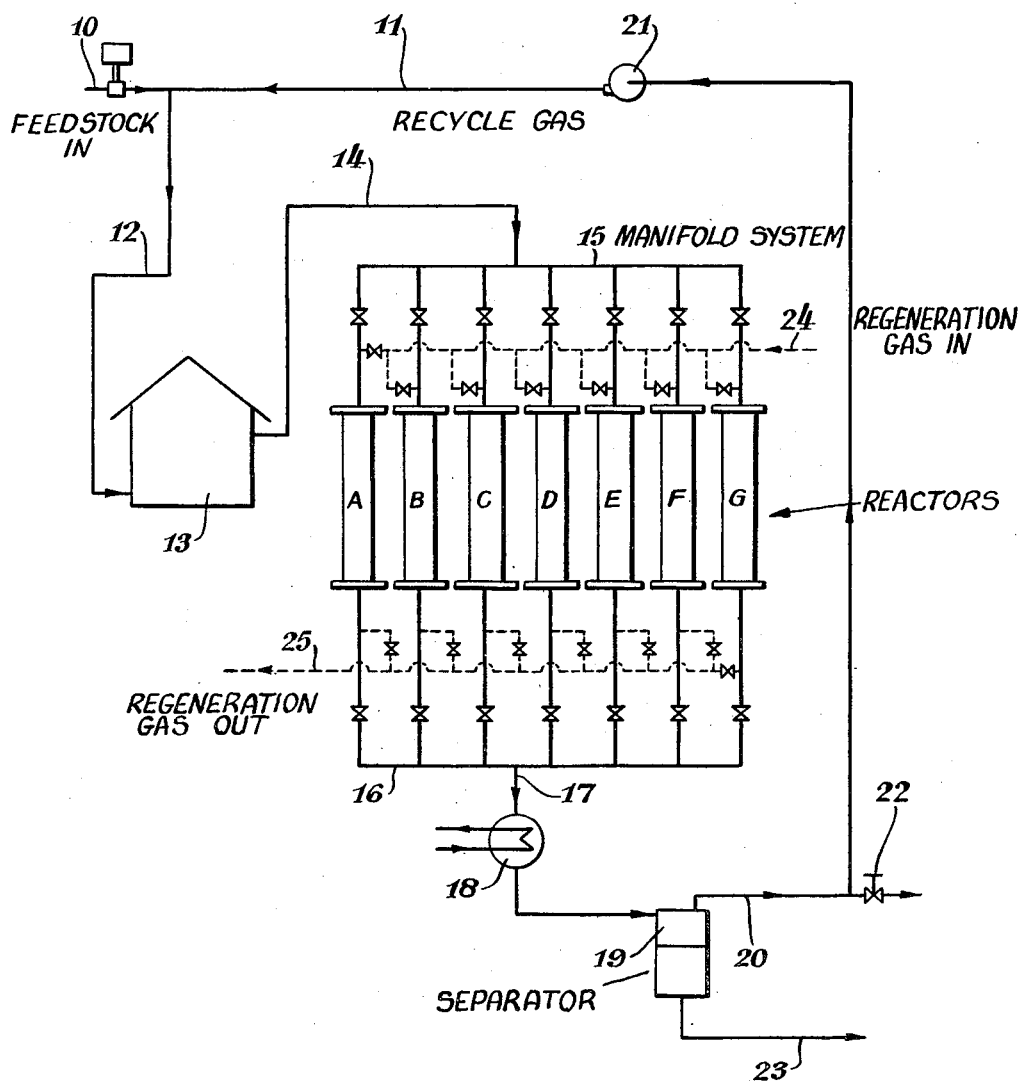
Inventor:
Frederick William Bertram Porter
By:
Morgan, Finnegan & Durham
His Attorney

United States Patent Office 2,706,703
Patented Apr. 19, 1955

2,706,703

CATALYTIC DESULPHURISATION OF PETROLEUM HYDROCARBONS

Frederick William Bertram Porter, Sunbury-on-Thames, England, assignor to The British Petroleum Company Limited Application February 23, 1951, Serial No. 212,343

Claims priority, application Great Britain March 14, 1950

5 Claims. (Cl. 196—28)

This invention relates to the hydrocatalytic desulphurisation of petroleum hydrocarbons.

Among the processes which are known for the removal of organically combined sulphur from petroleum hydrocarbons is the so called hydrofining process in which the petroleum hydrocarbons to be desulphurised are passed in admixture with hydrogen over a sulphur-resistant hydrogenation catalyst at elevated temperature and pressure whereby the organically combined sulphur is converted into hydrogen sulphide which may readily be removed from the treated hydrocarbons the properties of which are not otherwise appreciably affected. This process is technically effective for the removal of organically combined sulphur from petroleum hydrocarbons but is not commercially attractive in view of the cost of supplying the considerable quantity of hydrogen consumed in the process. It was also known that the hydroforming process produced hydrogen and at the same time effected a considerable degree of desulphurisation, but by its very nature this process is not applicable in cases where it is desired to desulphurise feedstocks, such as gas oils and aromatic extracts, without appreciably affecting the properties of the feedstock, other than changes consequent upon the removal of the organically combined sulphur as hydrogen sulphide. Desulphurisation processes are also known in which a substance capable of supplying hydrogen under the conditions of the desulphurisation reaction is added to the feedstock to be desulphurised, but this is only a special case of hydrofining and suffers from the disadvantage of the cost of supplying the hydrogen donor and from the additional disadvantage that the through-put of the feedstock is reduced by the addition of the considerable quantity of hydrogen donor necessary to supply sufficient hydrogen.

It was then discovered that by careful control of the temperature and pressure and by using a sufficiently active dehydrogenation-hydrogenation catalyst, it was possible to derive sufficient hydrogen by dehydrogenation of naphthenes contained in the feedstock to enable sufficient of the organically combined sulphur in the feedstock to be converted into hydrogen sulphide, under the same temperature and pressure conditions, to constitute an effective desulphurisation process. This process has been called "autofining" and it has the considerable advantage as compared with hydrofining that all the hydrogen required for desulphurisation is derived from the feedstock itself. It was surprising to find that conditions existed under which the two reactions of dehydrogenation of naphthenes and hydrogenation of organic sulphur compounds could proceed simultaneously to the extent necessary to provide a satisfactory catalytic desulphurisation process. The process was found to be applicable to a wide variety of feedstocks ranging from naphthas to wax distillates under the following set of conditions:

Pressure _____ p. s. i. ga__   50–200
Temperature _____ ° F__   750–800
Space velocity _____ v./v./hr__   1.0–5.0
Recycle rate _____ C. F./B__   2000–4000

The preferred catalyst for use in the autofining process is of the so-called cobalt molybdate type which comprises mixtures of the oxides of cobalt and molybdenum, or chemical compounds of cobalt, molybdenum and oxygen, or mixtures of one or both of said oxides with said compounds either alone or incorporated with a support. It has been found that there is a period at the commencement of each run during which the gas make is negligible or non-existent and the desulphurisation is not at its maximum. This low dehydrogenating activity of the catalyst is more noticeable at low feedstock velocities and with the heavier feedstocks. It was discovered that the non-activity of the catalyst during the early hours on stream could be largely overcome by subjecting the catalyst to the action of hydrogen sulphide or hydrogen sulphide-containing gas prior to its use in the autofining process.

The regeneration of the used catalyst may be carried out by burning off the carbon and sulphur deposits with either a nitrogen/air or steam/air mixture. The following conditions may be employed for regeneration.

Inlet temperature _____ ° F__   800–850
Steam or nitrogen flow _____ v./v./hr__   700–900
Air flow _____ v./v./hr__   50–60
Inlet oxygen _____ percent mol__   1 to 1.5

The inlet oxygen concentration is controlled to keep the catalyst bed temperature below 1100° F. Regeneration restores the activity of the catalyst completely and it has been found that a large number of regenerations has no effect on the activity or properties of the catalyst.

The autofining process may be operated by setting the pressure in the autofining zone at a predetermined level and thereafter withdrawing from the system gas in excess of that required to maintain the predetermined pressure. In this case, there is a continuous make of hydrogen indicating that the hydrogen produced in the dehydrogenation reaction is not being fully utilised in the desulphurisation reaction. An improved method of operation was therefore developed in which the hydrogen-containing gaseous fraction is recycled to the reaction zone and the pressure therein allowed to rise to an equilibrium pressure at which the hydrogen evolved equals the hydrogen consumed. This method of operation results in a greater degree of desulphurisation and increased on-stream hours for a product of given sulphur content.

One disadvantage of the autofining process is that when it is used for the desulphurisation of certain feedstocks, e. g. $SO_2$ kerosine extracts and gas oils, the sulphur content of the product increases with increasing hours on stream with the result that the product obtained during the later stages of the process may have a sulphur content exceeding that permitted in official specifications. For example, when a gas oil feedstock containing 1 per cent by weight of sulphur is autofined at 2.0 v./v./hr., 100 p. s. i. ga., and 2,000 C. F./B. gas recycle, the sulphur content of the product varies from 0.3 to 0.6 per cent at 200 hours' operation.

This difficulty can be overcome by the provision of storage and blending facilities or by the adoption of the moving bed or fluid catalyst technique.

The present invention provides a further process by means of which the variation in the sulphur content of the product may be reduced to a greater or lesser extent when using static bed reactors.

According to the invention, an autofining process is carried out in a system comprising a plurality of static bed reactors, each reactor being withdrawn from the system in turn from regeneration of the catalyst after a period on stream determined by the number of reactors in the system and the total desired on-stream time of the catalyst.

By an autofining process is meant a process in which a petroleum feedstock is passed in vapour form in admixture with hydrogen over a catalyst which combines activity for the dehydrogenation of naphthenes to aromatics with activity for the hydrogenation of organic sulphur compounds and which is not poisoned as a catalyst by the presence of sulphur compounds, under conditions of temperature and pressure which are correlated so that dehydrogenation of naphthenes contained in the feedstock is effected to an extent not substantially in excess of that required to produce sufficient hydrogen to convert organically combined sulphur in the fraction into hydrogen sulphide and to maintain the pressure in the reaction zone, the hydrogen and hydrogen sulphide being separated from the treated feedstock and the hydrogen recycled to the reaction zone as the sole source of hydrogen to said zone.

Any number of reactors may be employed depending upon the variation which can be tolerated in the sulphur content of the product. The same catalyst charge may be employed as with a single large reactor and the charge is distributed equally among the number of reactors on stream at any one time. Thus, the minimum number of reactors to be on stream at any one time during the operation of the system will be at least two with an additional reactor undergoing regeneration.

In carrying the invention into effect, the process is started with $(n-1)$ of the reactors on stream where $n$=number of reactors in the system. After a period of time equal to the total desired on-stream time of the catalyst divided by the number of reactors on stream at any one time, one reactor is disconnected from the system and regenerated, being replaced by the spare reactor. After a similar period, the next reactor is taken off stream and regenerated, and the process is continued until all the reactors have been regenerated, whereupon the cycle is repeated. The term "total desired on-stream time" as employed herein and in the appended claims, is intended to mean simply the time the catalyst is to remain on stream before regeneration is required. This time is constant for any particular feedstock and set of process conditions and is independent of the number of reactors employed.

In the system of $n$ reactors above mentioned, one reactor is always serving as a spare reactor while $n-1$ reactors are on-stream. At the end of the period of time above mentioned the first of the $n-1$ reactors is disconnected and replaced by the spare reactor. The disconnected reactor is placed under regeneration and must be ready to take the place of the second of the $n-1$ reactors when the same period of time has again elapsed. The same is true as to the third of the $n-1$ reactors, and so on. It follows that if regeneration of the spare reactor, that is, the disconnected reactor, is to be accomplished within each such period of time, as it is, then the regeneration time, which for convenience may be designated "$r$," is also equal to the total desired on-stream time ($t$) divided by ($n-1$) the number of reactors on stream at any one time; that is, $$r = \frac{t}{n-1}$$

The system of $n$ reactors therefore is one in which $$n \text{ equals } \frac{t}{r} + 1$$

Manifestly, $n$ must be at least 3 if there is to be more than one reactor on stream at a time, as is required.

The catalyst is distributed in substantially equal portions among the reactors of the system, and the regeneration of the catalyst portions in the various reactors is staggered, that is, the reactors are withdrawn from regeneration one at a time, sequentially, at equal time intervals or process periods each corresponding to the time required for regeneration of each catalyst portion. Hence, after each such process period, the catalyst portions in the different reactors have been on stream for different periods and hence are at different stages of exhaustion, i. e., different proportions of the total desired on-stream time have expired in the different reactors. The total desired on-stream time of each catalyst portion is the same, however, so that the end of the total desired on-stream time for that portion is the same as the point of complete exhaustion of that portion and of that portion only. However, after each of the process periods above mentioned, the summated on-stream hours of all the reactors is always the same so that if all the catalyst portions in the various reactors be regarded as a single charge, the state of the catalyst is constant, and thus the sulphur content of the bulked product is constant.

A reactor system for use according to the present invention is illustrated in the accompanying diagram. The feedstock enters through line 10 and after admixture with the recycle gas from line 11 passes through line 12 to the pre-heater 13 from which the hot vapours pass via line 14 to the manifold system 15. The latter is controlled to pass equal proportions of the feed to six of the seven reactors A–G, the remaining reactor undergoing regeneration. The vapours issuing from the various reactors are collected in the manifold 16 and are passed via line 17 through the cooler 18 and thence to the separator 19. The gaseous product is removed overhead from the separator 19 via line 20 and is recycled into admixture with the incoming feed via the booster 21, the pressure in the system being maintained by the control valve 22, while the liquid product is removed from the separator via the line 23 and passed to a stabiliser. Regeneration is effected by means of a mixture of steam and air admitted via the manifold 24 and the resulting exhaust gases leave via the manifold 25.

The valve system is arranged so that any individual reactor can be regenerated while the remainder are on stream. Assuming the desired on-stream period to be 200 hours, the system is operated as follows.

Operation is commenced with six reactors on stream. After 33 hours, one reactor is disconnected, purged with steam and regenerated, being replaced by the seventh reactor. After a similar period, a second reactor is taken off stream and replaced by the one just regenerated, so that when all have been regenerated and replaced, the following steady condition will be maintained.

Reactor A _____ Catalyst fresh.
Reactor B _____ Catalyst 33 hours spent.
Reactor C _____ Catalyst 66 hours spent.
Reactor D _____ Catalyst 99 hours spent.
Reactor E _____ Catalyst 132 hours spent.
Reactor F _____ Catalyst 165 hours spent.
Reactor G _____ Catalyst regenerating.

When autofining in a system as above described a gas oil of 1 per cent by weight of sulphur at 2.0 v./v./hr., a temperature of 780° F., 100 p. s. i. ga., pressure and 2,000 S. C. F./B. recycle, a product with a sulphur content of 0.5 per cent (±0.02 per cent) is obtained, representing a sulphur removal equivalent to 55 per cent by weight. It has been indicated above that by operating in a single static bed reactor, the sulphur content of the product varies from 0.3 to 0.6 per cent by weight.

Furthermore, in the example given above, seven reactors have been used and the replacement time (33 hours) is approximately the same as that taken for normal regeneration after 200 hours on stream and moreover, operation according to the present invention avoids any standing time and reheating of the regenerated reactors. It may however be preferable to use a smaller number of reactors and to take longer time over the regeneration.

The method according to the present invention may also be carried out in accordance with the equilibrium pressure method of operation as above referred to. This equilibrium pressure method is described in detail in U. S. patent application Serial No. 153,339 filed April 1, 1950, which application now stands allowed. Thus, with the same number of reactors, the operating pressure could be maintained at 150 p. s. i. and the sulphur content of the product could be maintained at 0.3 per cent (±.02 per cent by weight) i. e., 70 per cent sulphur removal.

I claim:

1. A process for the hydrocatalytic desulphurisation of a naphthene- and sulphur-containing petroleum feedstock, which comprises charging a system of ($n$) reaction zones, $n$ having a value of at least 3, with a sulphur-resistant dehydrogenation-hydrogenation catalyst, the total catalyst charge in said system being distributed substantially equally among said zones, continuously passing substantially equal proportions of the feedstock in vapor form in admixture with hydrogen simultaneously and at substantially equal space velocity to ($n-1$) reaction zones of said system, while maintaining one reaction zone of said system on a stand-by basis; contacting said mixture in the said ($n-1$) reaction zones with said catalyst at an elevated temperature and pressure such that sufficient hydrogen is produced by dehydrogenation of naphthene hydrocarbons contained in the feedstock to effect the conversion of sulphur compounds contained in the feedstock into hydrogen sulphide and to maintain pressure in said ($n-1$) reaction zones; recycling said hydrogen-rich gas mixture into admixture with the incoming feedstock for passage to said ($n-1$) reaction zones so as to constitute the whole of the hydrogen supplied to said ($n-1$) reaction zones; recovering a desulphurized product from said products of said ($n-1$) reaction zones;

discontinuing the passage of said mixture to each of said $(n-1)$ reaction zones in turn after periods of time each equal to the total desired on-stream time divided by $(n-1)$ of the catalyst charge in said system; replacing in sequence each of said $(n-1)$ reaction zones, with the reaction zone of said system which is then on a stand-by basis; passing said mixture to said $(n-1)$ reaction zones as so replaced; and, regenerating the catalyst in the reaction zone as and from which the passage of said mixture thereto is discontinued whereby one reaction zone of said system will always be maintained on said stand-by basis to replace the zone next in sequence for removal from the system for regeneration.

2. A process according to claim 1, wherein said reaction zones are constituted by static bed reactors.

3. A process according to claim 1, wherein said catalyst is of the cobalt molybdate type.

4. A process in accordance with claim 1 in which the temperature is a selected temperature within the range of about 750–800° F. and a selected pressure within the range of about 50–200 p. s. i. gauge, said temperature and pressure being correlated to effect a net production of hydrogen from the feedstock.

5. A process in accordance with claim 1 wherein the hydrogen-rich gas mixture is recycled to the reaction zones and the pressure therein in each allowed to rise to an equilibrium pressure at which the hydrogen evolved equals the hydrogen consumed.

References Cited in the file of this patent

UNITED STATES PATENTS

| | | |
|---|---|---|
| 2,486,361 | Nahin et al. | Oct. 26, 1949 |
| 2,498,559 | Layng et al. | Feb. 21, 1950 |
| 2,567,252 | Strang | Sept. 11, 1951 |
| 2,573,726 | Porter et al. | Nov. 6, 1951 |
| 2,647,857 | Horne | Aug. 4, 1953 |